April 8, 1958     W. C. BERGSTROM     2,829,543
COUNTERSINKING, COUNTERBORING AND DEBURRING TOOL
Filed Dec. 7, 1953     2 Sheets-Sheet 1

INVENTOR.
WALTER C. BERGSTROM
BY

April 8, 1958   W. C. BERGSTROM   2,829,543
COUNTERSINKING, COUNTERBORING AND DEBURRING TOOL
Filed Dec. 7, 1953   2 Sheets-Sheet 2
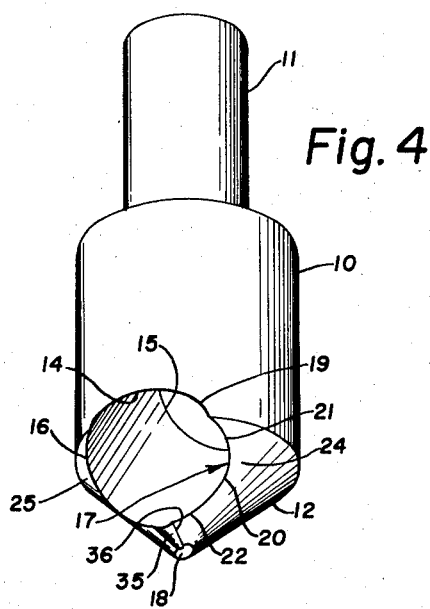
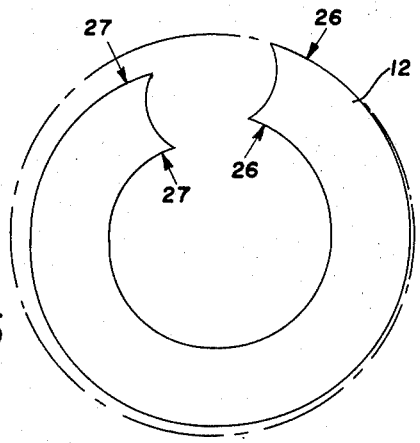
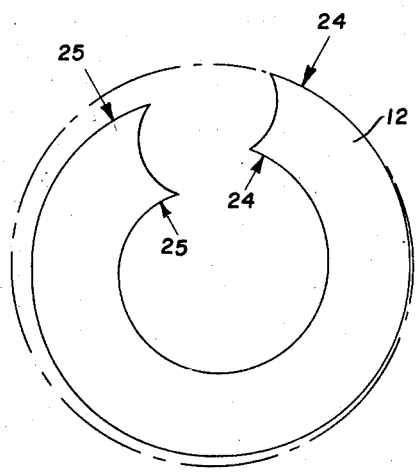
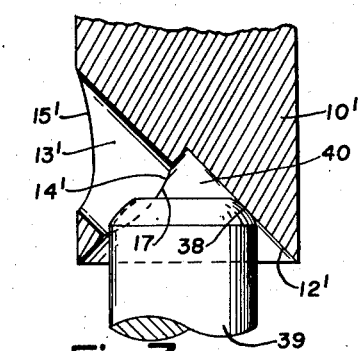
INVENTOR.
WALTER C. BERGSTROM United States Patent Office 2,829,543
Patented Apr. 8, 1958

2,829,543

COUNTERSINKING, COUNTERBORING, AND DEBURRING TOOL

Walter C. Bergstrom, Cleveland, Ohio, assignor to The Weldon Tool Company

Application December 7, 1953, Serial No. 396,410

4 Claims. (Cl. 77—73.5)

This invention relates to new and useful improvements in countersinking, counterboring, and deburring tools.

An important object of the invention is the provision of constructions for such tools which will prevent chattering of the tool in use and provide precision smooth surfaces in workpieces.

Another important object is the provision of a tool body with a spirally generated beveled surface and a chip or shaving receiving opening or bore intersecting and opening out into such surface to provide an improved shear action cutting edge having the necessary relief or cutting clearance.

Another important object is the arrangement of such cutting edge relative to said spirally generated beveled surface to cause the cutting edge to recede as a compound curved cutting edge and to function with a stabilizing shear cutting action.

A further important object is the provision of a tool of the above type in which the chip or shaving receiving opening penetrates not only the spirally generated beveled surface, but also the cylindrical surface of the tool body to additionally provide the latter with an arcuate cutting edge as a continuation of the curved cutting edge provided in said spirally beveled surface whereby the tool can be employed to simultaneously countersink and counterbore an opening in a workpiece and to rapidly clear away chips or shavings from the cutting edge.

A still further object is the provision of a tool which will cut a crowned countersunk surface and will also effectively remove burrs from the edges of holes and the inside corners of tubular products.

A still further object is the provision of a tool which will cut a crowned countersunk surface and will also effectively remove burrs from the edges of holes and the corners of the work.

Other objects and a fuller understanding of this invention may be had by referring to the following description and claims, taken in conjunction with the accompanying drawings, in which:

Figure 4 is a perspective view of the end of the tool shown in Figure 2 with the tool tilted topside away from the viewer;

Figure 5 is a somewhat diagrammatic view of a radially generated spirally beveled surface, such as a clock-spring spiral, plotted in a flat plane;

Figure 6 is a similar view of a longitudinally spirally generated beveled surface, such as a screw helix, plotted in a flat plane; and Figure 7 is a longitudinal section of a female tool embodying certain features of the invention and illustrating the production of an external bevel on a cylindrical workpiece.

Figure 1:
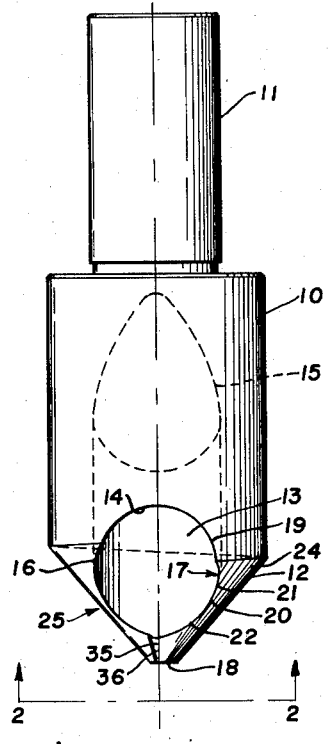
Figure 1 is a side view of the improved tool having a longitudinally generated spiral according to the concepts of this invention.

Referring now more particularly to the drawings, the numeral 10 designates a cylindrical or annular tool body having a chuck engaging driving shank 11. The end of the tool body opposite the shank 11 is provided with a spirally generated beveled surface 12 which is arranged at the desired angle for which the tool is designed to countersink, and here shown at substantially a forty-one degree angle with a plane arranged normal to the axis of the tool. The body 10 may be of various shaped cross sections and is termed the counterboring portion of the tool, while the surface 12 is termed the countersinking portion. A large chip or shaving receiving circular-section bore 13 extends through the tool at an angle of approximately forty-five degrees to the tool axis to intersect and open out at its lower end 14 into the spirally generated beveled surface 12 as well as into the adjoining cylindrical surface of the tool body. The upper end 15 of this bore intersects and opens out into the upper cylindrical surface of the tool body adjacent the shank end thereof to rapidly guide and discharge chips and shavings from the cutting operation. As seen in Figure 1, first and second juncture edges are formed on opposite sides of the axis of the tool and each reside in both the counterboring portion and the countersinking portion. The axis of the bore 13 is preferably arranged generally normal to the beveled surface 12. Opposite side edges 16 and 17 of the lower end of the bore at their juncture with the spirally generated beveled and cylindrical surfaces penetrate or intercept the major portion of the width of the beveled surface 12. The edge 17 constituting the cutting edge of the tool or countersinking cutting edge is disposed at the start or beginning of the spirally generated beveled surface, while the opposite edge or relieved trailing edge 16 is arranged in the trailing or tail end of this spiral surface. Thus, the cutting edge 17 has greater radial extent than the opposite edge 16 to provide for cutting edge clearance. It will be further observed that the bore or opening 13 covers a greater portion of the width of the spirally generated beveled surface 12 so that it extends almost to the end 18 of the tool and also substantially into the cylindrical surface of the tool body to provide for rapid chip ejection and whereby the cylindrical body of the tool is provided with an arcuate cutting edge or counterboring cutting edge 19 used in counterboring operations. Due to the relatively large size of the bore 13, as compared with the width of the spirally generated beveled surface 12, this bore provides the surface 12 with a relatively large gap or opening serving as a relief or clearance just ahead of the cutting edge 17.

Viewing Figure 4, it will be noted that the curved cutting edge 19 in the cylindrical body portion is a continuation of the arcuate cutting edge 17 in the spirally generated beveled surface 12. The edge 19 might be referred to as one portion of a compound cutting edge and the edge 17 might be referred to as another portion. It will also be observed that the mid-portion 20 of the arcuate cutting edge 17 recedes at a point about midway the width of the spirally beveled surface 12 to form a compound curved cutting edge having a first cutting section 21 nearest the cylindrical body and a second cutting section 22 nearest the end 18 of the tool. These two cutting sections 21 and 22 may be referred to as positive and negative portions of the cutting edge, which when in use, shave the metal of the workpiece with a shearing action and gather these shavings toward the mid-point 20 to assist in the stabilization of the tool against chatter. The extension 19 of the cutting edge 17 constitutes a third cutting section thereof in a combined counterboring and countersinking operation. Since this third cutting section 19 is a continuation of the cutting edge 17, defined by the circular end 14 of the bore and is disposed in the cylindrical body 10, it presents an undercut curve similar to the edge 17, but at such an angle relative to the cylindrical surface of body 10 that it cuts with a shearing action ahead of the cutting section 21 when counterboring. However, the sections 19 and 21 being at different sectors of the opening 14, act as a compound cutting edge with substantially opposing shear cutting action in somewhat the same manner as the sections 21 and 22 to further stabilize the tool against chattering when in use. It will be observed further that the cutting sections 21 and 22 are arranged generally diagonally across the width of the spirally generated beveled surface 12.

The spirally generated beveled surface 12 may be provided in several ways. Preferably, it is a spiral surface generated longitudinally of the tool in the order of a screw spiral or helix and, as such, is diagrammatically plotted in a plane in Figure 6, where the width at the beginning of the spiral, designated by the numeral 24, is narrower than the width of the spiral at its trailing end and designated by the numeral 25. This spiral surface is continued around the tool from the cutting edge 17 for about three hundred degrees about its axis, where this beveled surface is intersected by the chip receiving bore 13. In other words, the bore 13 interrupts or removes a portion of the beveled surface 13 and a portion of the cylindrical wall of the body 10. The three hundred degree extent of the spirally generated surface is sufficient to form a cutting clearance for the cutting edges 17 and 19 to dispose them at a greater radial distance from the axis of the tool than the opposite trailing edge 16 of the bore 13. Viewing Figure 1, it will be observed that the spirally beveled surface adjacent the edge 16 of the bore 13 is disposed further along the longitudinal direction of the tool and into the surface of the body 10 at a distance from the edge 17 to form the requisite relief or clearance for the cutting edge 19 disposed on the cylindrical surface of the tool body. This spirally generated surface may also be provided by a radially generated spiral surface on the order of a clock-spring spiral or helix which will relieve this surface and provide requisite cutting edge clearance. Figure 5 diagrammatically shows a radially generated clock-spring spiral, in which the width of the spirally beveled surface 12 is the same at its initiating point 26 as it is at its other or trailing end 27. This spirally beveled surface may also be provided by a combination of both the longitudinally and radially generated spirals; or be suitably relieved or profiled with a relief surface ahead of the cutting edge. Therefore, the term "spirally generated beveled surface", wherever referred to herein, shall include any of these ways, or a combination of them, for relieving the beveled surface and providing clearance for the cutting edges.

Figure 2:
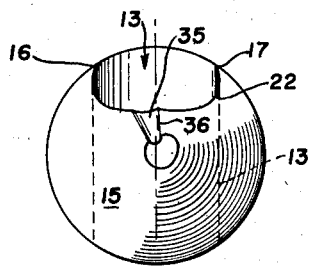
Figure 2 is an end elevation thereof looking from the direction of the line 2—2 of Figure 1.

For starting the tool in very small drilled holes, the spirally generated beveled surface 12 near the end 18 immediately in front of the outermost portion of the cutting edge section 22, and as best seen in Figures 1, 2 and 4, is relieved with a groove 35 extending across the beveled surface 12 and having an arcuate bottom and one side edge 36. This edge 36 provides a small straight cutting edge with the necessary clearance and forms, in effect, a straight continuation of the cutting edge section 22 for starting in small holes.

Figure 3:
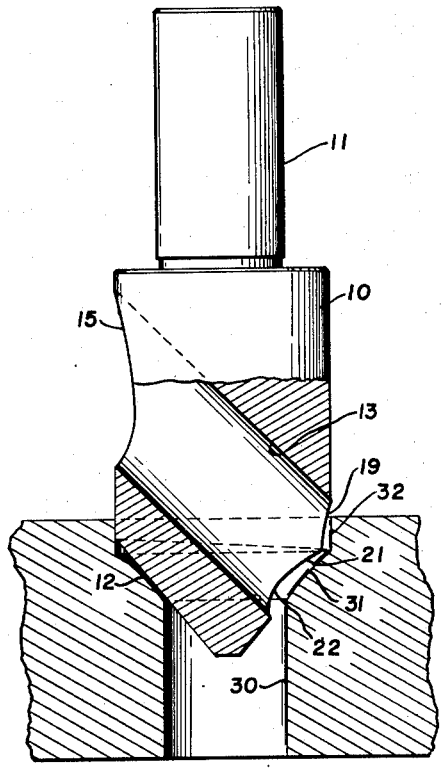
Figure 3 is a side view, partly in longitudinal section, showing the tool engaged in countersinking and counterboring a drilled hole in a workpiece.

Reference to Figure 3 will illustrate the use of the tool in a combined countersinking, counterboring and deburring operation where the slightly crowned countersunk portion of a hole 30 in a workpiece is indicated by the numeral 31, and the counterbored portion is designated by the numeral 32. This crowning of the countersunk portion 31 is extremely slight, and is shown exaggerated in the drawing for clarity. The two operations of countersinking and counterboring are simultaneously performed by the tool with the cutting sections 20, 21 and 22 of the cutting edge 17 forming the countersink 31, while the cutting section 19 of the cutting edge is counterboring the hole 32. It will be observed from Figures 3, 5 and 6 that the surface 31 provided in a workpiece 30 by rotation of the tool therein, is not a flat beveled surface, but is a crowned beveled surface which will provide a line contact with the bevel surface on a screw head. Thus, beveled screw heads of various sizes and angles of bevel, or those having irregularities, will find their proper seat upon the crowned countersunk surface 31. It will also be appreciated that all cutting edges of the tool will also serve as an efficient deburring tool to trim burrs from the edges or corners of holes or the like.

In Figure 7 is illustrated a female version of the tool for producing a beveled or slightly beveled crowned surface 38, or to deburr the end and external corner edges of cylindrical work indicated by the numeral 39. Parts of this female tool which correspond with countersinking parts of the form of invention heretofore described are designated with the same reference numerals, with a prime coefficient added thereto. However, the spirally generated beveled surface 12' of the female tool 10' is provided on the walls of a tapered cavity or recess 40 extending longitudinally from and into the end of the tool instead of being generated upon an external surface thereof, as in the case of the preceding modification. Like the preceding form, the body 10' of this female tool is provided with a chip or shaving receiving bore or opening 13', which intersects and opens into the spirally generated beveled surface 12' to form spaced apart juncture edges 16 and 17 as in the preceding modification; with the cutting edge 17 thereof having a compound curve possessing the same curved cutting sections 20, 21 and 22 and acting with shear cutting action as in the preceding form of invention.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A combined countersinking and counterboring tool comprising, a body having counterboring and countersinking portions, said countersinking portion having a spirally generated beveled surface, said surface having a bore having a common end penetrating and opening into both the surface of said counterboring portion of said body and said spirally generated beveled surface, the juncture of the edges of said bore opening with said surfaces forming two circumferentially spaced juncture edges, one of which has greater radial extent than the other to provide a compound curved cutting edge having a portion arranged in said surface of said counterboring portion and another portion arranged in said spirally generated beveled surface and arranged diagonally across said beveled surface, said spirally generated beveled surface being extended into said counterboring portion to provide clearance for said portion of said compound carved cutting edge, and said portions of said cutting edge functioning to simultaneously countersink and counterbore a drilled opening in a workpiece when said tool is rotated therein.

2. A combined countersinking and counterboring tool comprising, a cylindrical body having a cylindrical surface and a spirally generated beveled surface, said surfaces having a chip receiving bore penetrating the same, said bore penetrates and opens into and across said beveled surface and penetrates and opens into said cylindrical surface of said cylindrical body, the juncture of the edges of said bore with said surfaces forming two spaced juncture edges, one of which has greater radial extent than the other to provide a compound curved cutting edge arranged in said beveled surface and in said cylindrical surface, said cutting edge being curved and arranged diagonally across said beveled surface to provide a first arcuate cutting section and a second arcuate cutting section thereon, the first arcuate cutting section being arranged nearest the cylindrical surface of said cylindrical body, said first and second arcuate cutting sections having a place of merger at substantially the mid-point of the width of said spirally generated beveled surface and which is more receded than the other portions of said cutting sections to provide said curved cutting edge with positive and negative cutting edge portions functioning as a countersink and to gather chips toward the mid-section of said cutting edge to assist in stabilization of the tool against chattering and to discharge chips into said bore, and said cutting edge having a third cutting section arranged in said cylindrical surface of said body to function as a counterbore and to discharge chips into said bore.

3. A combined countersinking and counterboring tool comprising a body having countersinking and counterboring portions, said countersinking portion including a spirally generated beveled surface, said counterboring portion including an annular surface, a bore extending through said tool and intersecting both said spirally generated beveled surface and said annular surface, the intersection of said bore with said spirally generated beveled surface forming a countersinking cutting edge and a relieved trailing edge, the intersection of said bore with said annular surface forming a counterboring cutting edge, said countersinking portion having an apex end portion, a groove extending from the intersection of said bore with said spirally generated beveled surface to said apex end portion to form a secondary cutting edge.

4. A combined countersinking and counterboring tool comprising a body having countersinking and counterboring portions, said countersinking portion including a spirally generated beveled surface, said counterboring portion including an annular surface, a bore extending through said tool and intersecting both said spirally generated beveled surface and said annular surface, the intersection of said bore with said spirally generated beveled surface forming a countersinking cutting edge and a relieved trailing edge, the intersection of said bore with said annular surface forming a counterboring cutting edge.

References Cited in the file of this patent
UNITED STATES PATENTS

| | | |
|---|---|---|
| 724,520 | Taylor | Apr. 7, 1903 |
| 2,442,554 | Swiatek | June 1, 1948 |

FOREIGN PATENTS

| | | |
|---|---|---|
| 966,178 | France | Mar. 1, 1950 |